US005785165A

United States Patent [19]

Stahlhut et al.

[11] Patent Number: 5,785,165

[45] Date of Patent: Jul. 28, 1998

[54] DATA COLLECTION AND ANALYSIS SYSTEM FOR PASSENGER CONVEYORS

[75] Inventors: Michael Stahlhut, Rehburg-Loccum; Oliver Stöxen, Seelze, both of Germany

[73] Assignee: Otis Elevator Company, Farmington, Conn.

[21] Appl. No.: 739,573

[22] Filed: Oct. 30, 1996

[51] Int. Cl.$^{6}$ .................... B65G 43/00

[52] U.S. Cl. .................... 198/322; 198/323

[58] Field of Search .................... 198/322, 323

[56] References Cited

U.S. PATENT DOCUMENTS

| | | | |
|---|---|---|---|
| 5,482,153 | 1/1996 | Abraham et al. | 198/322 |

FOREIGN PATENT DOCUMENTS

| | | | |
|---|---|---|---|
| 3611597 | 10/1987 | Germany | 198/322 |
| 0395096 | 4/1991 | Japan | 198/323 |
| 0524778 | 2/1993 | Japan | 198/323 |
| 5229775 | 9/1993 | Japan | 198/323 |

*Primary Examiner*—James R. Bidwell

[57] ABSTRACT

A control system for a passenger conveyor includes a controller, a plurality of sensors, and an interface between the sensors and the controller. The interface receives the signals from the sensors and analyzes and converts the signals into the proper format for communication to the controller.

7 Claims, 2 Drawing Sheets

DATA COLLECTION AND ANALYSIS SYSTEM FOR PASSENGER CONVEYORS

TECHNICAL FIELD

The present invention relates to passenger conveyors, and more particularly to control systems for such passenger conveyors.

BACKGROUND OF THE INVENTION

Passenger conveyors, such as escalators and moving walks, are efficient means of transporting passengers from one landing to another. A typical passenger conveyor includes a plurality of sequentially connected treadplates that move through a closed loop path between the landings. The treadplates, which may be steps or pallets, are driven continuously through the path by a motor.

Control systems for passenger conveyors have traditionally been simple devices for changing the direction of the conveyor and to shut down the conveyor in the event of an emergency. Newer, modern conveyors, however, have begun to incorporate additional sensors to more efficiently operate the conveyor. Among the additional sensors are devices for detecting the presence of passengers. With these sensors, the conveyor may be either shut down or run at slow speed during periods of minimal use. Such sensors still only provide a binary output and require minimal, if any, analysis of the output.

Other types of sensors that produce a range of outputs have been applied to passenger conveyors, although typically they are used to produce an output that is compared to a threshold or trigger level. If the measured level exceeds the threshold, an alarm is triggered and the controller for the escalator responds accordingly. This type of system ignores much of the value of such sensors in providing maintenance and prognostic information about the escalator or moving walk. A limitation on the use of these sensors is due to the fact that these sensors typically produce analog outputs and require significant amounts of wiring to route the various sensor signals to the controller.

The above art notwithstanding, engineers under the direction of Applicant's Assignee are working to develop control systems for passenger conveyors that minimize maintenance costs and maximize the efficiency of the conveyor.

DISCLOSURE OF THE INVENTION

According to the present invention, a control system for a passenger conveyor includes a controller, a plurality of sensors, and an interface that receives the signals from the plurality of sensors and converts the received signals to signals receivable by the controller. The interface then and serially communicates the converted signals to the controller. In a further embodiment, the interface includes means to analyze the received signals and communicates the results of the analysis on to the controller.

As a result of the present invention, multiple analog sensors may be used without requiring excessive wiring. This reduces the cost of installation of the conveyor. In addition, the invention may be used with a variety of controllers since either the raw sensor data may be serially communicated to the controller for analysis, or the analyzed data may be forwarded to the controller for response.

In a particular embodiment, the plurality of sensors includes sensors that monitor the step chain elongation, sensors that monitor the lubricant level of the drive machine, and sensors that monitor the truss and lubricant temperatures. The data from the monitoring of the step chain elongation is used to determine and predict when a step or the step-chain may need replacing. The data from the oil level monitoring is used to schedule maintenance on the passenger conveyor. The lubricant temperature data is used to calculate the lubricant wear and the remaining useful life of the lubricant. The truss temperature data is used to determine if heating devices in the truss need to be powered.

As a result of having this additional detail regarding the status of the passenger conveyor, the operator is better able to coordinate and efficiently manage the maintenance of the conveyor. In addition, unexpected shut downs of the conveyor may be avoided or minimized.

As used herein, "passenger conveyor" means a transportation device for continually moving passengers between two predetermined landings, such as an escalator or a moving walk.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
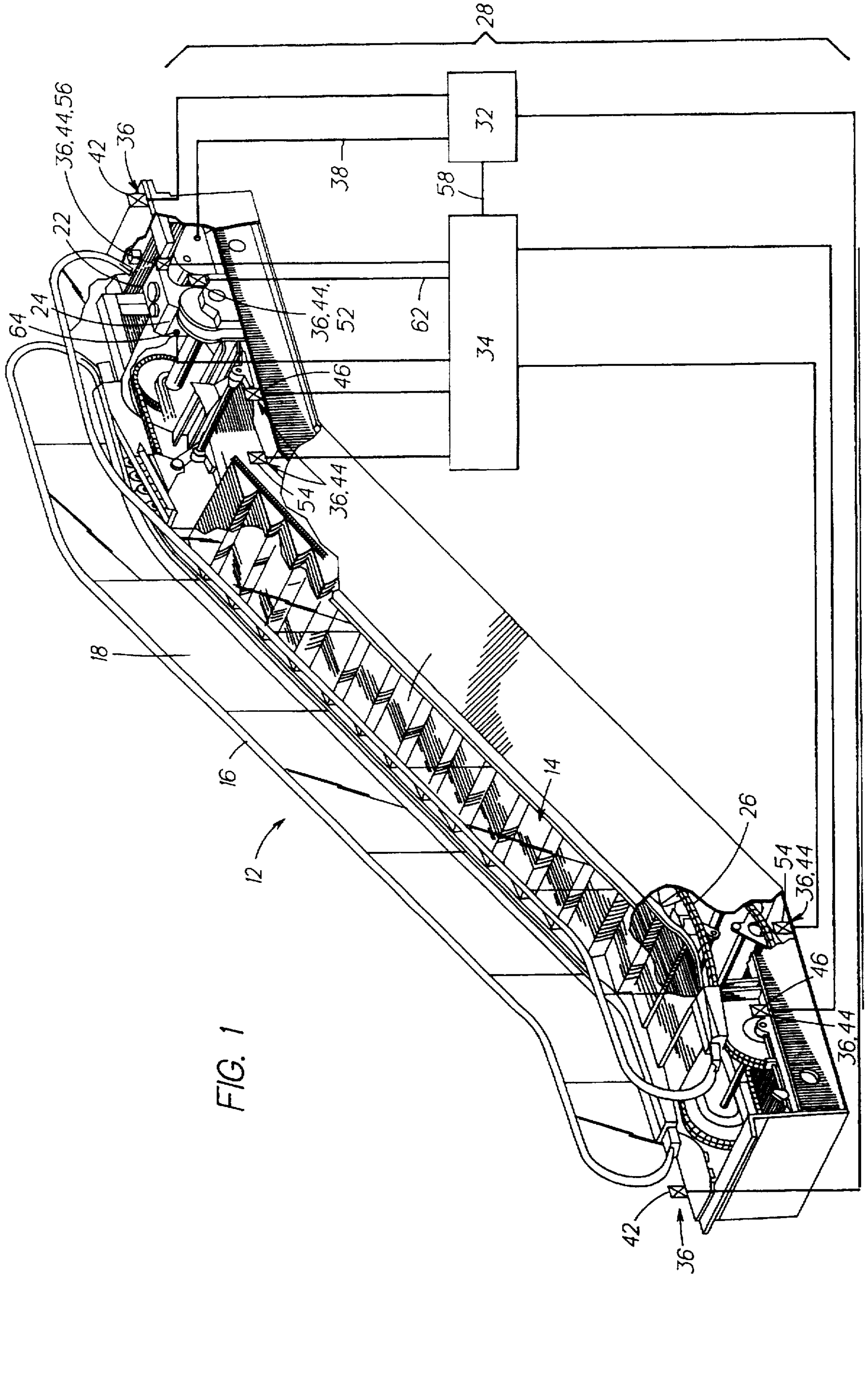
FIG. 1 is a perspective view of an escalator.

A passenger conveyor 12, illustrated as an escalator in FIG. 1, includes a continuous loop of steps or treadplates 14, a pair of handrails 16 and a pair of balustrades 18 extending along the side of the steps 14, and a drive system 22. The drive system 22 includes a drive machine 24 that provides motive force to a drive or step chain 26 that is connected to the steps 14.

Figure 2:
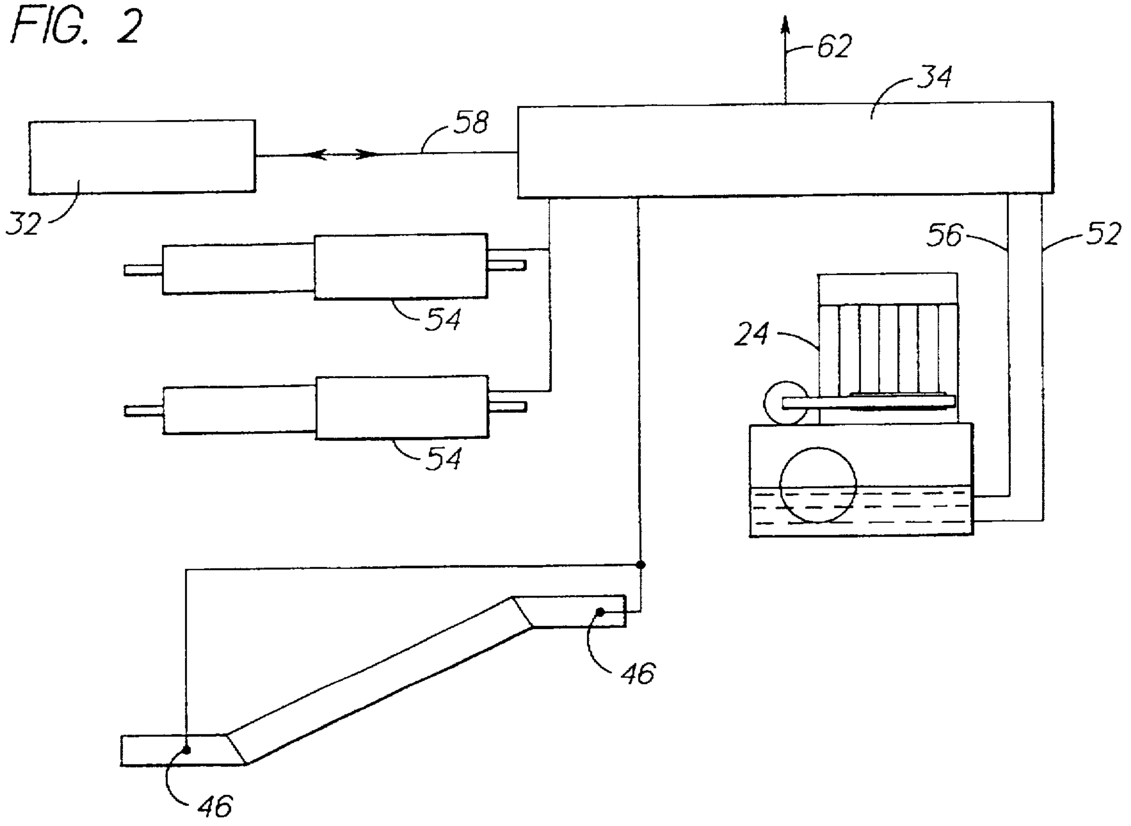
FIG. 2 is a an illustrative view of the portion of the control system having the plurality of sensors, the interface and the communication line.

The escalator 12 also includes a control system 28, illustrated schematically in FIG. 2, that determines the operational status of the escalator 12. The control system 28 includes a controller 32, an interface 34, and a plurality of sensors 36 distributed throughout the escalator 12. The controller 32 uses the inputs from the sensors 36, along with commands manually input by the operator, to communicate via a communication line 38 to the drive system 22 the proper operational status for the escalator 12. For instance, the operator will input the direction of travel of the treadplates 14 into the controller 32. In addition, the escalator 12 includes passenger detection sensors 42 that trigger the controller 32 to direct the drive system 22 to increase the speed of the treadplates 14.

The escalator 12 shown in FIG. 1 also includes a plurality of analog sensors 44. These sensors 44 include temperature sensors 46 in the truss 48, temperature sensors 52 in the drive machine 24, step chain elongation sensors 54, and lubricant level sensors 56 in the drive machine 24. Each of the analog sensors 44 is connected directly into the interface 34, which is connected to the controller 32 via a serial communication link 58.

The interface 34 provides conversion of the analog signals to digital signals and provides analysis of the received signals. The interface 34 then forwards either the raw digital signal to the controller 32 or sends the results of the analysis to the controller 32, as appropriate. In addition, the interface 34 includes an output 62 that directly communicates a received signal on to a relay 64 in the drive machine 24 for immediate response if an emergency situation is detected.

The step chain elongation sensors 54 determine the change in length of the step chain 26 during operation. The amount of elongation may be used to determine the need for maintenance to avoid a shut-down of the escalator 12. In addition, a sudden change in length of the step chain 26 may indicate a failure in the step chain 26 or a missing treadplate 14. In this instance, this information is directly fed to the drive system 22 via line 62 to stop the operation of the escalator 12.

The lubricant level sensors 56 are used to determine the need for maintenance to replenish the lubricant in the drive machine 24. In this way, unnecessary visits by the mechanic may be avoided and the level of lubricant may be maintained at the optimum level in the machine 24.

The lubricant temperature sensor 52 is used to determine the wear of the lubricant. The operating temperature of the lubricant is inversely related to the expected life of the lubricant, i.e., the higher the operating temperature, the shorter the expected life of the lubricant and the sooner it must be replaced. The expected life can be compared to the time interval since the lubricant was first used in that machine 24 to estimate the need for replacement. This determination avoids using lubricant beyond its useful life and avoids replacing the lubricant unnecessarily.

The truss temperature sensor 46 is used to determine if the escalator 12 requires heating to ensure proper operation. If the temperature sensor 46 indicates that the truss temperature is too low, heaters (not shown) are powered to increase the temperature of the truss.

In addition, the difference between the lubricant temperature and the ambient temperature of the machine 24 may be used to determine the wear of various escalator 12 components. The temperature difference, as measured by subtracting the output of the truss temperature sensor 46 from the lubricant temperature sensor 52, is related to the load on the drive machine 24. High loads on the drive machine 24 are caused by high loads on the escalator 12. Such high loads may cause excessive wear of the escalator 12 components, such as the drive mechanisms for the steps 14 and handrails 16. The level of temperature difference can be used to determine the frequency of maintenance required for an escalator.

The interface 34 analyzes the various signals from the sensors 44 to determine if a warning signal should be generated. If the analysis results in the generation of a warning signal, this is communicated to the controller 32 and an appropriate response is taken by the controller 32. In addition, the outputs of the sensors 44 may also be serially communicated to the controller 32 to provide means to record the operational status of the escalator 12.

By using an interface, there is no need to have each of the sensors directly communicate with the controller. This provides the advantage of minimizing the amount of wiring in the escalator because only a serial communication link is necessary between the interface and the controller. In addition, it minimizes the number of inputs required in the controller. Further, a variety of analog sensors may be used with different types of controllers. This provides the advantage of being able to back-fit more detailed and robust sensors and control systems onto existing passenger conveyors.

Although the invention has been shown and described with respect to exemplary embodiments thereof, it should be understood by those skilled in the art that various changes, omissions, and additions may be made thereto, without departing from the spirit and scope of the invention.

We claim:

1. A control system for a passenger conveyor, the passenger conveyor having a moving platform driven by a machine along a predetermined path, wherein the machine includes a supply of lubricant, the control system including:

a controller that determines the operational status of the passenger conveyor;

a plurality of sensors disposed throughout the passenger conveyor, wherein each of the sensors produces an analog signal, wherein the plurality of sensors include a sensor to measure the temperature of the lubricant and a sensor to measure the ambient temperature about the passenger conveyor; and an interface that receives signals from each of the plurality of sensors, the interface converting each signal to a signal communicable to the controller and serially sending the converted signals to the controller, wherein the interface includes means to analyze the received analog signals, wherein the interface generates a warning signal if the analysis of the received signals indicates a fault condition of the passenger conveyor, and wherein the interface serially sends the warning signal to the controller, and wherein the interface determines the condition of the escalator by determining the difference between the lubricant temperature and the ambient temperature.

2. A control system for a passenger conveyor, the passenger conveyor having a moving platform driven by a machine along a predetermined path, the control system including:

a controller that determines the operational status of the passenger conveyor;

a plurality of sensors disposed throughout the passenger conveyor, wherein each of the sensors produces an analog signal;

an interface that receives signals from each of the plurality of sensors, the interface converting each signal to a signal communicable to the controller and serially sending the converted signals to the controller, wherein the interface further includes means to send one or more of the received signals directly to a relay, and wherein the relay is responsive to the signal to affect the operation of the passenger conveyor.

3. The control system according to claim 2, wherein the interface further includes means to analyze the received analog signals, wherein the interface generates a warning signal if the analysis of the received signals indicates a fault condition of the passenger conveyor, and wherein the interface serially sends the warning signal to the controller.

4. A control system for a passenger conveyor, the passenger conveyor having a moving platform driven by a machine along a predetermined path, wherein the passenger conveyor includes a drive chain, the drive chain engaged with the platform and the machine to transmit motion from the machine to the platform, the control system including:

a controller that determines the operational status of the passenger conveyor;

a plurality of sensors disposed throughout the passenger conveyor, wherein each of the sensors produces an analog signal, wherein one of the plurality of sensors is a sensor to measure chain elongation; and an interface that receives signals from each of the plurality of sensors, the interface converting each signal to a signal communicable to the controller and serially sending the converted signals to the controller.

5. A control system for a passenger conveyor, the passenger conveyor having a moving platform driven by a machine along a predetermined path, wherein the machine includes a supply of lubricant, the control system including:

a controller that determines the operational status of the passenger conveyor;

a plurality of sensors disposed throughout the passenger conveyor, wherein each of the sensors produces an analog signal, wherein one of the plurality of sensors is a sensor to measure the level of lubricant; and an interface that receives signals from each of the plurality of sensors, the interface converting each signal to a signal communicable to the controller and serially sending the converted signals to the controller.

6. A control system for a passenger conveyor, the passenger conveyor having a moving platform driven by a machine along a predetermined path, wherein the machine includes a supply of lubricant, the control system including:

a controller that determines the operational status of the passenger conveyor;

a plurality of sensors disposed throughout the passenger conveyor, wherein each of the sensors produces an analog signal, wherein one of the plurality of sensors is a sensor to measure the operating temperature of the lubricant; and an interface that receives signals from each of the plurality of sensors, the interface converting each signal to a signal communicable to the controller and serially sending the converted signals to the controller, wherein the interface determines the condition of the lubricant by comparing the sensed temperature of the lubricant to a predetermined operating temperature based upon the time interval since the machine was first operated with that supply of lubricant.

7. The control system according to claim 6, wherein the passenger conveyor includes a truss, wherein one of the plurality of sensors is a sensor to measure the temperature within the truss.

* * * * *